(12) United States Patent
Mitsui

(10) Patent No.: US 8,275,962 B2
(45) Date of Patent: Sep. 25, 2012

(54) USER ROLES CONTROLLING EXECUTION OF OPERATIONS ON COPY PAIR VOLUMES

(75) Inventor: Shogo Mitsui, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 12/688,027

(22) Filed: Jan. 15, 2010

(65) Prior Publication Data
US 2011/0099345 A1   Apr. 28, 2011

(30) Foreign Application Priority Data
Oct. 23, 2009   (JP) .................. 2009-244348

(51) Int. Cl.
*G06F 12/14*   (2006.01)

(52) U.S. Cl. ............... 711/163; 711/162; 711/E12.091

(58) Field of Classification Search .................. 711/162, 711/163, E12.091
See application file for complete search history.

(56) References Cited

U.S. PATENT DOCUMENTS

| | | | |
|---|---|---|---|
| 7,185,192 B1 * | 2/2007 | Kahn | 713/155 |
| 7,225,190 B2 | 5/2007 | Iwamura et al. | |
| 7,685,123 B1 * | 3/2010 | Thompson et al. | 707/783 |
| 2006/0161721 A1 | 7/2006 | Iwamura et al. | |
| 2006/0190693 A1 * | 8/2006 | Asano et al. | 711/163 |
| 2008/0086612 A1 * | 4/2008 | Murayama et al. | 711/163 |
| 2008/0109442 A1 | 5/2008 | Shinohara et al. | |
| 2008/0222374 A1 | 9/2008 | Hiraiwa et al. | |

FOREIGN PATENT DOCUMENTS

| | | |
|---|---|---|
| JP | 2005-332354 A | 12/2005 |
| JP | 2006-125918 | 5/2006 |
| JP | 2006-259971 | 9/2006 |
| JP | 2007-156673 | 6/2007 |
| JP | 2008-117251 | 5/2008 |
| JP | 2008-225530 | 9/2008 |

* cited by examiner

*Primary Examiner* — Charles Rones
*Assistant Examiner* — Hal Schnee
(74) *Attorney, Agent, or Firm* — Foley & Lardner LLP

(57) ABSTRACT

One or a plurality of copy pairs are disposed in a plurality of storage systems. A management server determines the propriety of execution of an operation request for each user for either a local copy pair or a remote copy pair. As operation requests, a pair create, a split, a resync, a restore, and a pair delete can be cited.

9 Claims, 17 Drawing Sheets

130

OPERATIONAL AUTHORITY MANAGEMENT TABLE

| 131 | 132 | 133 REPLICATION DEFINITION | | 134 REPLICATION OPERATION | | |
|---|---|---|---|---|---|---|
| ROLE | STORAGE SETTING | 1331 | 1332 | 1341 | 1342 | 1343 |
| | | CREATE | DELETE | SPLIT | RESYNC | RESTORE |
| STORAGE ADMINISTRATOR | ENABLED | ENABLED | ENABLED | ENABLED | ENABLED | ENABLED |
| COPY PAIR ADMINISTRATOR | DISABLED | ENABLED | ENABLED | ENABLED | ENABLED | ENABLED |
| APPLICATION ADMINISTRATOR | DISABLED | DISABLED | DISABLED | ENABLED | ENABLED | ENABLED |
| APPLICATION OPERATOR | DISABLED | DISABLED | DISABLED | ENABLED | ENABLED | DISABLED |

USER MANAGEMENT TABLE

| USER ID | PW | ADMINISTRATOR AUTHORITY | ROLE |
|---|---|---|---|
| UID001 | PW1 | 1 | STORAGE ADMINISTRATOR |
| UID002 | PW2 | 0 | COPY PAIR ADMINISTRATOR |
| UID003 | PW3 | 0 | APPLICATION ADMINISTRATOR |
| UID004 | PW4 | 0 | APPLICATION OPERATOR |

OPERATIONAL AUTHORITY MANAGEMENT TABLE (130)

| ROLE (131) | STORAGE SETTING (132) | REPLICATION DEFINITION (133) | | REPLICATION OPERATION (134) | | |
|---|---|---|---|---|---|---|
| | | CREATE (1331) | DELETE (1332) | SPLIT (1341) | RESYNC (1342) | RESTORE (1343) |
| STORAGE ADMINISTRATOR | ENABLED | ENABLED | ENABLED | ENABLED | ENABLED | ENABLED |
| COPY PAIR ADMINISTRATOR | DISABLED | ENABLED | ENABLED | ENABLED | ENABLED | ENABLED |
| APPLICATION ADMINISTRATOR | DISABLED | DISABLED | DISABLED | ENABLED | ENABLED | ENABLED |
| APPLICATION OPERATOR | DISABLED | DISABLED | DISABLED | ENABLED | ENABLED | DISABLED |

FIG. 5

COPY GROUP MANAGEMENT TABLE (140)

| GROUP ID (141) | PVOL (142) | | SVOL (143) | | STATUS (144) |
|---|---|---|---|---|---|
| | VOLUME ID (1421) | STORAGE ID (1422) | VOLUME ID (1431) | STORAGE ID (1432) | |
| GID001 | VID001 | SID001 | VID101 | SID002 | SUSPENDED |
| GID001 | VID002 | SID001 | VID102 | SID002 | SUSPENDED |
| GID002 | VID003 | SID001 | VID103 | SID002 | COPYING(P→S) |
| GID003 | VID004 | SID001 | VID104 | SID002 | COPYING(S→P) |

FIG. 6

| | | | 150 |
|---|---|---|---|
| LOG MANAGEMENT TABLE | | | |
| 151 | 152 | 153 | 154 |
| DATE/TIME | EXECUTION USER | TARGET USER | OPERATION CONTENT |
| 2009/08/18 13:05:00 | ST-Admin-1 | CP-Admin-1 | SET TO COPY PAIR ADMINISTRATOR |
| 2009/08/18 13:20:00 | ST-Admin-1 | AP-Admin-1 | SET TO APPLICATION ADMINISTRATOR |
| 2009/08/18 13:30:00 | ST-Admin-1 | AP-Oper-1 | SET TO APPLICATION OPERATOR |

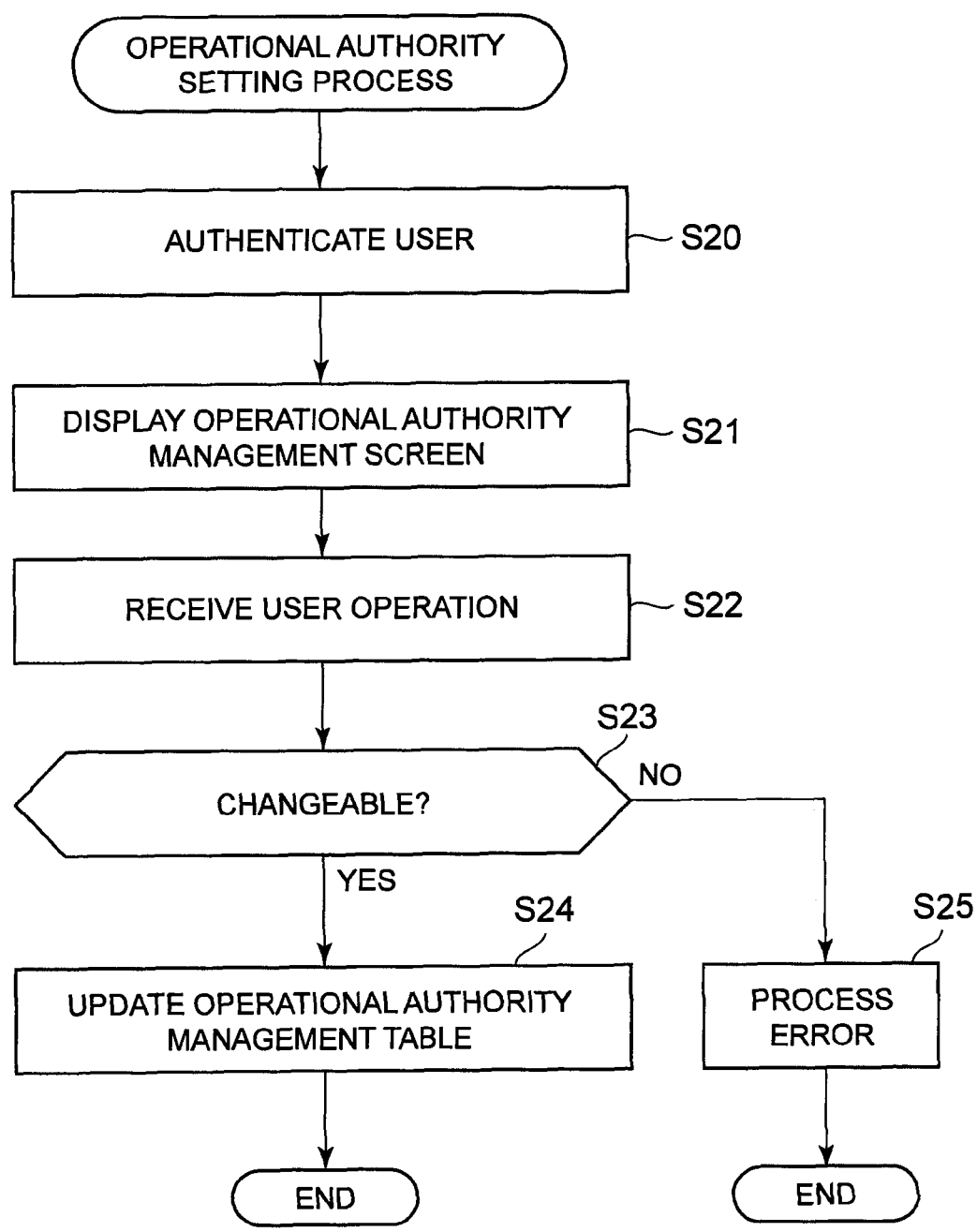

FIG. 10

OPERATIONAL AUTHORITY MANAGEMENT SCREEN — 510

| ROLE (511) | STORAGE SETTING (512) | REPLICATION DEFINITION (513) | | REPLICATION OPERATION (514) | | |
|---|---|---|---|---|---|---|
| | | CREATE (5131) | DELETE (5132) | SPLIT (5141) | RESYNC (5142) | RESTORE (5143) |
| STORAGE ADMINISTRATOR | ENABLED | ENABLED | ENABLED | ENABLED | ENABLED | ENABLED |
| COPY PAIR ADMINISTRATOR | DISABLED | ENABLED | ENABLED | ENABLED | ENABLED | ENABLED |
| APPLICATION ADMINISTRATOR | DISABLED | DISABLED | DISABLED | ENABLED | ENABLED | ENABLED |
| APPLICATION OPERATOR | DISABLED | DISABLED | DISABLED | ENABLED | ENABLED | DISABLED |

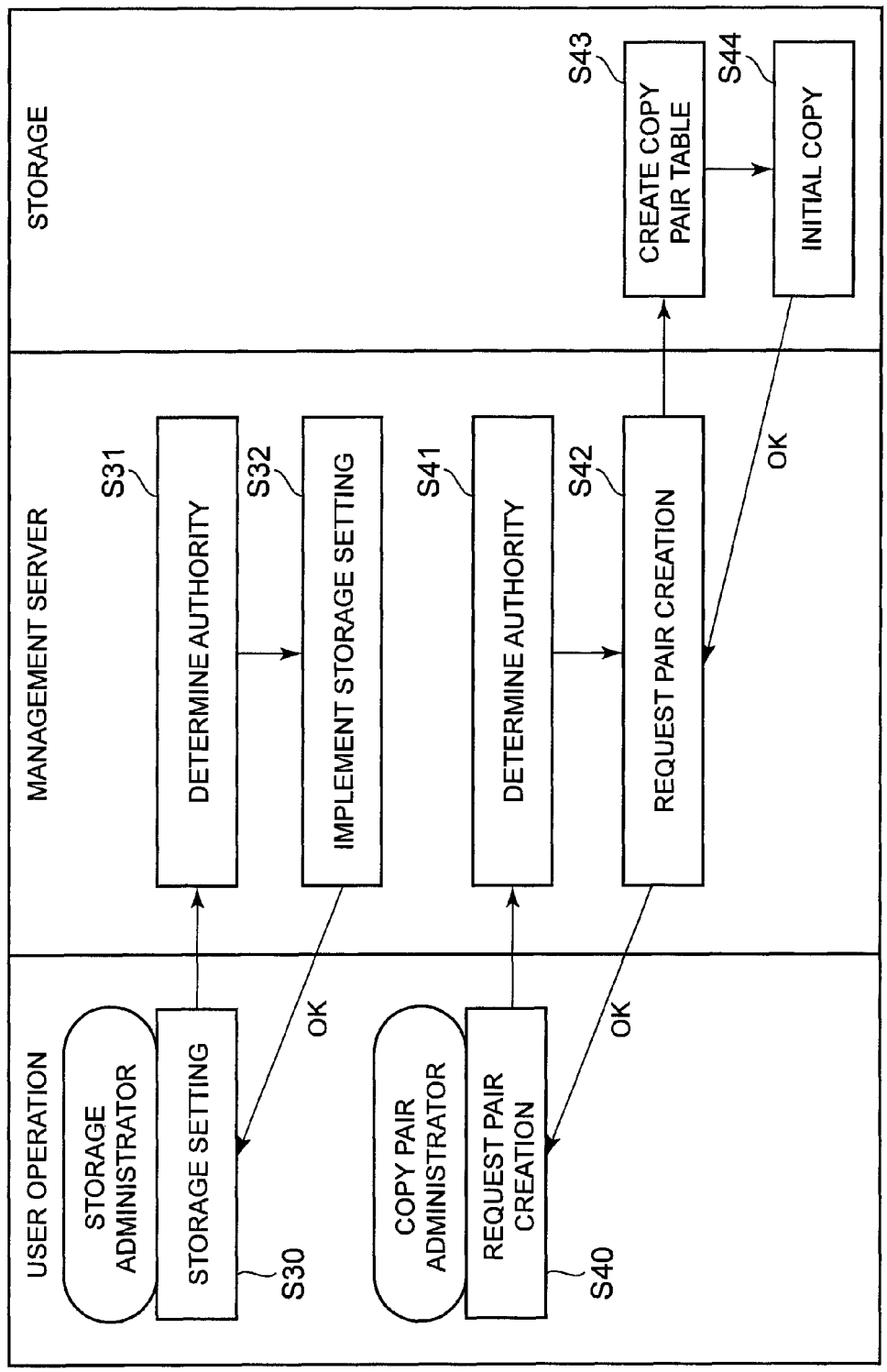

FIG. 15

USER MANAGEMENT TABLE 120A

| USER ID 121 | PW 122 | ADMINISTRATOR AUTHORITY 123A | ROLE 124A | GROUP ID 125A |
|---|---|---|---|---|
| UID001 | PW1 | 1 | STORAGE ADMINISTRATOR | GID010 |
| | | 0 | APPLICATION OPERATOR | GID020 |
| UID002 | PW2 | 0 | COPY PAIR ADMINISTRATOR | GID010 |
| | | 0 | APPLICATION ADMINISTRATOR | GID020 |
| UID003 | PW3 | 0 | APPLICATION ADMINISTRATOR | GID010 |
| | | 0 | COPY PAIR ADMINISTRATOR | GID020 |
| UID004 | PW4 | 0 | APPLICATION OPERATOR | GID010 |
| | | 1 | STORAGE ADMINISTRATOR | GID020 |

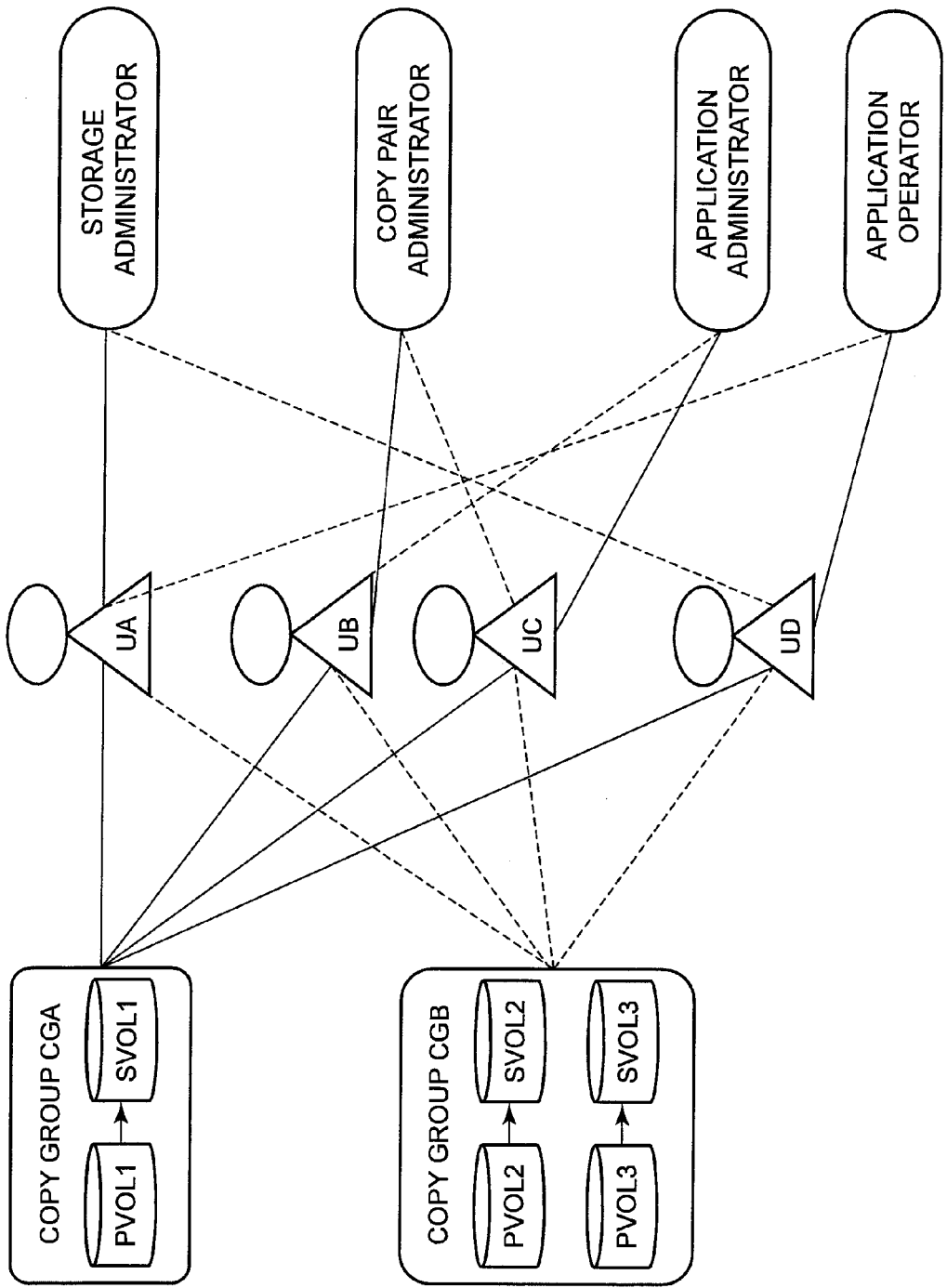

USER ROLES CONTROLLING EXECUTION OF OPERATIONS ON COPY PAIR VOLUMES

CROSS-REFERENCE TO RELATED APPLICATIONS

This application relates to and claims priority from Japanese Patent Application No. 2009-244348 filed on Oct. 23, 2009, the entire disclosure of which is incorporated herein by reference.

BACKGROUND OF THE INVENTION

1. Field of the Invention

The present invention relates to a computer system and a program recording medium.

2. Description of the Related Art

To preserve the data that a host computer uses, a technique for preparing a copy pair from a primary volume and a secondary volume, and regularly or irregularly copying data from the primary volume to the secondary volume is known. A local copy and a remote copy are known as copies between the primary volume and the secondary volume.

A local copy is executed between a primary volume and a secondary volume inside the same storage system. A remote copy refers to the copying of data from one storage system to another storage system.

A technique that makes it possible to control the remote copy operation for each copy group by issuing an instruction from a management apparatus to the storage system in accordance with a user operation is known (JP-A-2005-332354).

In the prior art, in a case where a copy pair is managed by a plurality of users, it is not possible to control the copy pair operational authority of each user. For example, there are cases in which a single copy pair is managed by a plurality of users with respectively different roles in the computer system, such as the user who is responsible for the entire system, the user who has responsibility for the copy pair, and the user who has responsibility for the service level of the application program.

In accordance with this, it is preferable that this copy pair be capable of being operated in accordance with the role of each user. However, the prior art does not include an aspect for managing the operation of a single copy pair by each of the users, making for poor usability.

SUMMARY OF THE INVENTION

Accordingly, an object of the present invention is to provide a computer system and a program recording medium that makes it possible to control the operation of the copy pair for each user. Another object of the present invention is to provide a computer system and a program recording medium, which, in a case where a plurality of users with respectively different roles are managing a single copy pair, makes it possible to control the propriety of operations related to this copy pair in accordance with the role of each user. Yet other objects of the present invention should become clear from the descriptions of the embodiments explained hereinbelow.

To solve for the above-mentioned problems, a computer system according to a first aspect of the present invention comprises a storage system and a management system, the storage system comprises a copy-source volume which is the logical volume of the copy source, and a copy-destination volume which is the logical volume of the copy destination, and the management system comprises a communication interface circuit which communicates with the storage system via a communication line, a memory which stores a prescribed program for managing the storage system, and a microprocessor which reads the prescribed program from memory and executes this program. The microprocessor receives a user-inputted operation request having as the operation target a single copy pair comprising a copy-source volume and a copy-destination volume, makes a determination as to whether or not to permit the execution of the operation request for each user who has inputted an operation request, and in a case where the execution of an operation request is permitted, sends a request corresponding to the operation request to the storage system.

In a second aspect according to the first aspect, roles related to the operation of the copy pair are set beforehand for the respective users, and the microprocessor determines whether or not to permit the execution of the operation request on the basis of the roles of the respective users.

In a third aspect according to the second aspect, a management table for managing, in association with each other, a plurality of roles prepared beforehand in relation of an operation-targeted copy pair, one or a plurality of operation requests that are capable of being executed for each role, and a plurality of users is stored in the memory, and the microprocessor uses the management table to determine whether or not to permit the execution of an operation request based on the roles of the respective users.

In a fourth aspect according to the second aspect, a prescribed operation request for changing the content stored in the copy-source volume is included in the operation request, and the users include a user who is permitted to execute a prescribed operation request and a user who is prohibited from executing a prescribed operation request.

In a fifth aspect according to the fourth aspect, the roles comprise a first role that is able to execute all operation requests related to an operation-targeted copy pair, a second role that is able to execute, from among all the operation requests, a copy-pair create request, a copy-pair delete request, a split request, a resync request, and a restore request, a third role that is able to execute, from among all of the operation requests, the split request, the resync request, and the restore request, and a fourth role that is able to execute, from among all of the operation requests, the split request and the resync request.

In a sixth aspect according to the fourth aspect, a plurality of operation-targeted copy pairs are provided, and a role for a first copy pair of the plurality of copy pairs and a role for a second copy pair of the plurality of copy pairs can be set such that the role differs for each user.

In a seventh aspect according to the sixth aspect, a third copy pair is included among the operation-targeted copy pairs, the third copy pair is associated with one of the first copy pair and the second copy pair, and an operation request that is executed for the copy pair of one of the first copy pair and the second copy pair that is associated with the third copy pair, is also executed for the third copy pair.

In an eighth aspect according to the first aspect, a plurality of storage systems are provided, the copy-source volume is disposed in one storage system of the plurality of storage systems, and the copy-destination volume is disposed in the other storage system of the plurality of storage systems.

The present invention may also be perceived as either a computer system or a recording medium for a computer program. Furthermore, the present invention is not limited to the combination of aspects described above, and may comprise combinations other than these.

BRIEF DESCRIPTION OF THE DRAWINGS

FIG. 3 is a diagram showing a user management table;

FIG. 4 is a diagram showing an operational authority management table;

FIG. 5 is a diagram showing a copy group management table;

FIG. 6 is a diagram showing a table for managing an operational authority change log;

FIG. 9 is a flowchart showing the process for setting the operational authority;

FIG. 10 is a management screen for setting the operational authority;

FIG. 11 is a diagram showing how to define and create a copy pair;

FIG. 15 is a diagram showing a user management table related to a second embodiment;

FIG. 17 is a schematic diagram showing the relationship between copy groups, users and roles.

DESCRIPTION OF THE PREFERRED EMBODIMENTS

The embodiments of the present invention will be explained below based on the drawings. In this embodiment, as will be explained below, in a case where a plurality of users with different scopes of responsibility (scopes of management) are managing a common copy pair, it is possible to set an executable operation request for each user.

[Embodiment 1]

Figure 1:
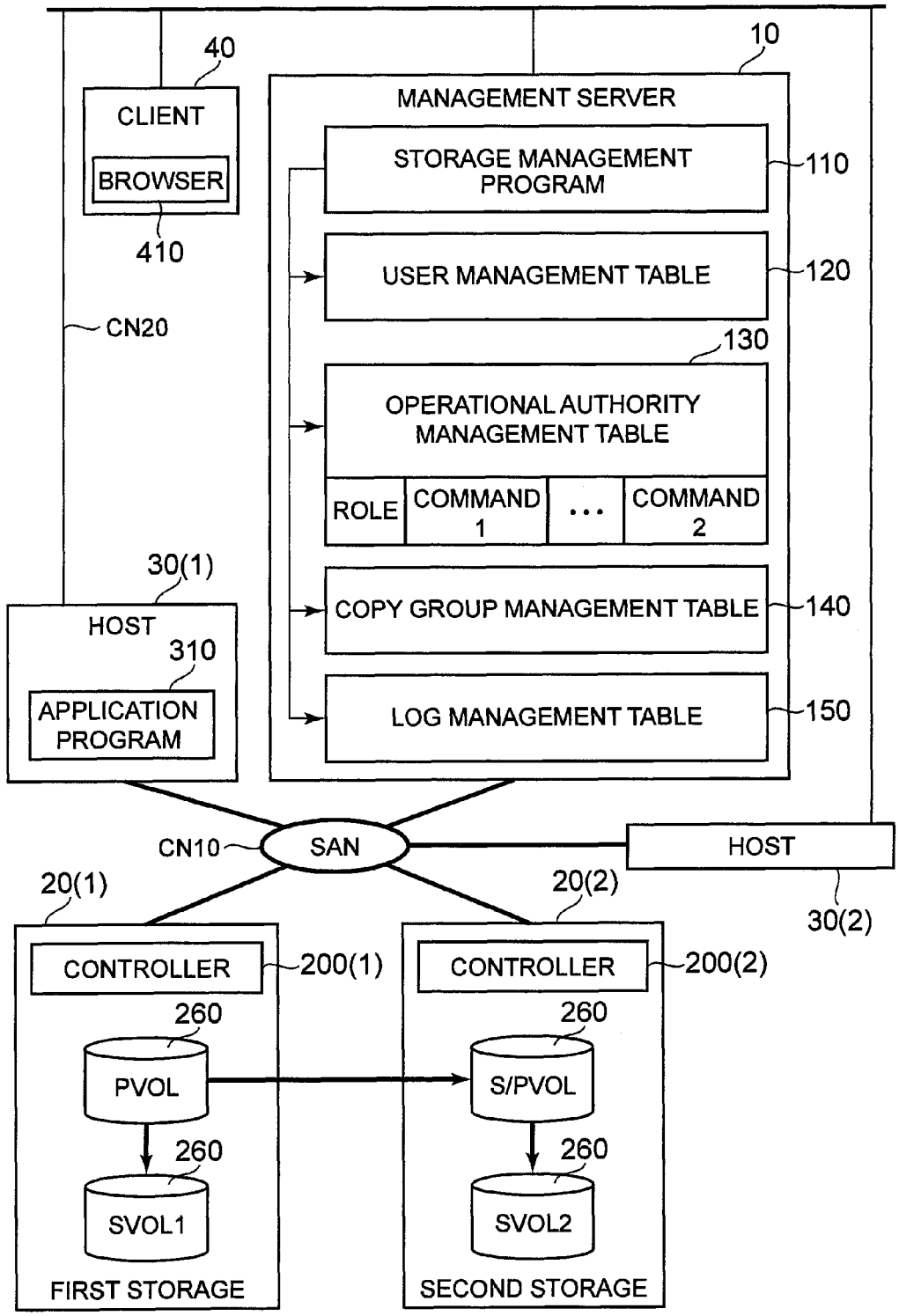
FIG. 1 is a schematic diagram showing an overview of the functions of a system related to this embodiment.

FIG. 1 shows an overview of an entire computer system according to this embodiment. The hardware configuration of the computer system will be described below using FIG. 2. The computer system, for example, comprises a management server 10, a first storage system 20 (1), a second storage system 20 (2), host computers (hereinafter, the hosts) 30 (1), 30 (2), and a client terminal 40. In a case where it is not particularly necessary to make a distinction, the hosts (30 (1), 30 (2) may be called the host 30, and the storage systems 20 (1), 20 (2) may be called the storage system 20.

The coupling configuration of the respective apparatuses will be explained. The management server 10, the respective storage systems 20 (1), 20 (2) and the respective hosts 30 (1), 30 (2) are coupled via a first communication network CN10. The management server 10, the respective hosts 30 (1), 30 (2) and the client terminal 40 are coupled via a second communication network CN20.

The first communication network CN10, for example, may be configured as a FC_SAN (Fibre Channel_Storage Area Network) or an IP_SAN (Internet Protocol_SAN). The second communication network CN20, which is the management communication network, for example, may be configured as a LAN (Local Area Network) or may be the Internet. Furthermore, the first communication network CN10 and the second communication network CN20 may be integrated, and configured to make a single communication network.

The management server 10 as a "management system", for example, comprises a storage management program 110, a user management table 120, an operational authority management table 130, a copy group management table 140, and a log management table 150. The storage management program 110 sends a request to the respective storage systems 20 (1), 20 (2) in accordance with an instruction from the client terminal 40. In addition, the storage management program 110 manages the respective tables 120 through 150. Each of tables 120 through 150 will be explained in detail below.

The first storage system 20 (1) and the second storage system 20 (2) may be disposed in the same site, or may be disposed in respectively different sites. Each of the storage systems 20 (1), 20 (2) correspond to a "storage system". Furthermore, the storage system provides at the least a primary volume and a secondary volume, and as long as it is possible to realize either a local copy or a remote copy, which will be explained below, a single storage system 20 may be the storage system, or the storage system 20 (1) and the storage system 20 (2) of FIG. 1 may collectively form the storage system.

The first storage system 20 (1), for example, comprises a controller 200 (1), and a plurality of logical volumes 260. One of the plurality of logical volumes 260 is a primary volume (PVOL) and the other one is a secondary volume (SVOL1).

The primary volume 260 (PVOL) stores data that is used by an application program 310 of the host 30. The secondary volume 260 (SVOL1) stores data copied from the primary volume 260 (PVOL). A data copy between the primary volume 260 (PVOL) and the secondary volume 260 (SVOL1) may be called a local copy, and a copy pair in accordance with the two volumes may be called a local copy pair.

The controller 200 (1) reads and writes data from and to the primary volume 260 (PVOL) based on an I/O (Input/Output) request issued from the host 30. In addition, the controller 200 (1) controls the operation of a local copy and a remote copy in accordance with an instruction from the management server 10. The controller 200 (1) also collects the various states of the storage system 20 (1) and sends these states to the management server 10. The various states, for example, include frequency and quantity of I/O requests, CPU load, memory consumption, and the presence or absence of a failure.

The second storage system 20 (2) comprises a controller 200 (2) and a plurality of volumes 260 the same as the first storage system 20 (1). One of the plurality of logical volumes 260 is an intermediate volume 260 (S/PVOL), and the other is a secondary volume 260 (SVOL2).

The intermediate volume 260 (S/PVOL) is located between the primary volume 260 (PVOL) and the secondary volume 260 (SVOL2), and performs the role of the secondary volume in a remote copy and the role of the primary volume in a local copy.

A remote copy pair is created using the primary volume 260 (PVOL), which is the copy source, and the intermediate volume 260 (S/PVOL), which is the copy destination. A local copy pair is created inside the second storage system 20 (2) using the intermediate volume 260 (S/PVOL), which is the copy source, and the secondary volume 260 (SVOL2), which is the copy destination.

Synchronous and asynchronous remote copy methods are known. In a synchronous remote copy, when data is written to the primary volume 260 (PVOL), this data is immediately transferred and written to the intermediate volume 260 (S/PVOL).

In an asynchronous remote copy, after data has been written to the primary volume 260 (PVOL), this data is transferred and written to the intermediate volume 260 (S/PVOL) at an arbitrary timing. Either one of the synchronous or asynchronous methods may be employed.

The controller 200 (2) controls processing related to the above-mentioned remote copy and local copy. In addition, the controller 200 (2) collects various states from inside the second storage system 20 (2) and sends these states to the management server 10.

The host 30, for example, is configured either as a so-called open system server computer or as a mainframe machine or other such computer. The host 30 comprises an application program 310. A customer management program, a sales management program, a video delivery program, a text creation program, an image creation program and an electronic mail management program can be cited as examples of the application program 310.

For example, the one host 30 (1) may be disposed at a local site together with the first storage system 20 (1), and the other host 30 (2) may be disposed at a remote site together with the second storage system 20 (2).

In addition, even in a case where either one of the sites has been suspended due to a failure, configuring the host 30 (1) and the host 30 (2) into a cluster makes it possible to use the application program 310 to provide information processing services at the other site.

The client terminal 40 is a computer terminal that utilizes the management server 10. The respective users provide instructions to the management server 10 via the client terminal 40. Furthermore, the client terminal 40 may also serve as the host 30.

Figure 2:
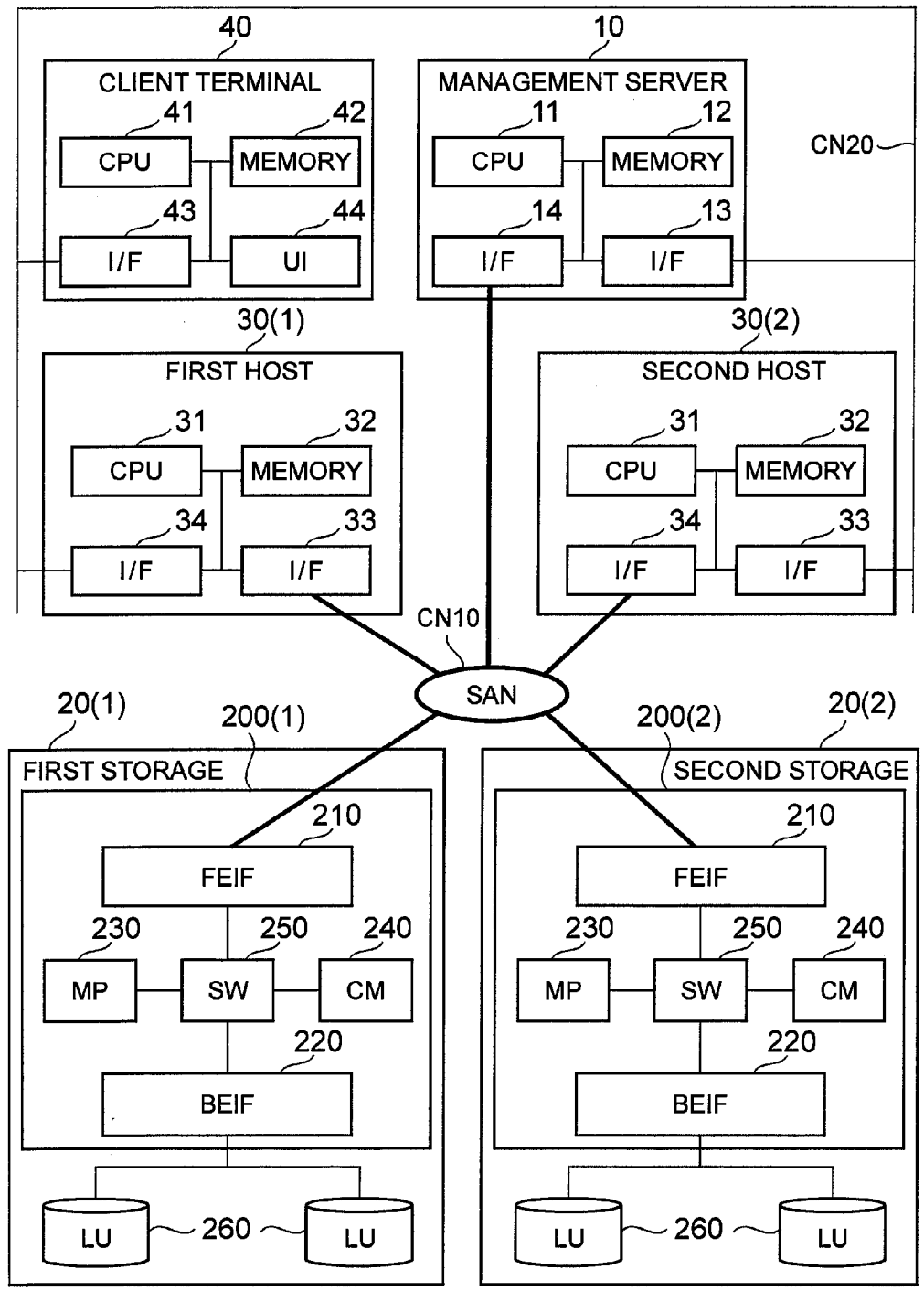
FIG. 2 is a block diagram of an entire computer system.

The hardware configuration will be explained by referring to FIG. 2. The management server 10, for example, comprises a microprocessor 11, a memory 12, and communication interfaces 13, 14. Furthermore, in the drawing, the microprocessor is abbreviated as CPU (Central Processing Unit) and the interface is abbreviated as I/F.

The memory 12, for example, is a storage device such as a RAM (Random Access Memory), a ROM (Read Only Memory), a flash memory device, or a hard disk drive. The memory 12, for example, stores an operating system, a storage management program 110, and the respective tables 120 through 150. The microprocessor 11 executes the processing described hereinbelow by reading and executing the storage management program 110 stored in the memory 12.

The one communication interface 13 is a circuit for communicating with the respective hosts 30 (1), 30 (2) and the client terminal 40 via the management communication network CN20. The microprocessor 11 collects information via the communication interface 13 and the communication network CN20, and, in addition, sends a prescribed instruction to the respective hosts 30 (1), 30 (2).

The other communication interface 14 is coupled to the respective storage systems 20 (1), 20 (2) and the respective hosts 30 (1), 30 (2) via the first communication network CN10.

Furthermore, the configuration may also do away with the client terminal 40 and provide a user interface in the management server 10. For example, the user is able to use a display device and a keyboard coupled to the management server 10 to provide an instruction to the management server 10.

The first storage system 20 (1) and the second storage system 20 (2) are configured substantially the same. Therefore, the configuration of the first storage system 20 (1) will be explained, and an explanation of the second storage system 20 (2) will be omitted.

The first storage system 20 (1) comprises a controller 200 (1) and either one or a plurality of logical volumes 260. The logical volume 260 is created on the basis of either one or a plurality of storage devices. A hard disk drive, a semiconductor memory, an optical disk drive, a magneto-optical disk drive, a magnetic tape drive and various other such storage devices capable of reading and writing data can be cited as examples of the storage device.

In a case where a hard disk device is used, for example, it is possible to use a FC (Fibre Channel) disk, a SCSI (Small Computer System Interface) disk, a SATA disk, an ATA (AT Attachment) disk, a SAS (Serial Attached SCSI) disk and the like. Further, for example, a flash memory, a FeRAM (Ferroelectric Random Access Memory), a MRAM (Magnetoresistive Random Access Memory), an Ovonic Unified Memory, a RRAM (Resistance RAM), and a PRAM (Phase change RAM) can also be used as the storage device. In addition, for example, the configuration may also be such that different types of storage devices, like a flash memory device and a hard disk drive, are used together in a mixed fashion.

The physical storage areas of either one or a plurality of storage devices may be grouped together, and either one or a plurality of logical storage areas may be provided in this group of storage areas. This logical storage area is called the logical volume 260.

The controller 200 (1), for example, comprises a front-end interface 210 (FEIF in the drawing), a back-end interface 220 (BEIF in the drawing), a microprocessor 230 (MP in the drawing), a cache memory 240 (CM in the drawing) and a switching circuit 250 (SW in the drawing). Furthermore, the controller 200 (1) is also able to couple to the management server 10 via a service processor (abbreviated as SVP) not shown in the drawing.

The front-end interface 210 is a communication control circuit for communicating with the hosts 30 (1), 30 (2), the management server 10, and the second storage system 20 (2) by way of the first communication network CN10. The back-end interface 220 is a communication control circuit for communicating with the respective storage devices configuring the logical volume 260.

The microprocessor 230 is for reading and executing a program stored in either the cache memory 240 or a prescribed logical volume 260. The cache memory 240 stores received data and a program. The switching circuit 250 couples the cache memory 240 to the microprocessor 230 and the respective communication interfaces 210, 220. Furthermore, the program and information of the various control tables do not necessarily have to be stored in the cache memory, and may be stored in a different memory. Furthermore, there may be a plurality of front-end interfaces 210, back-end interfaces 220, microprocessors 230, cache memories 240 and switching circuits 250 configuring the controller 200. In addition, the controller 200 need not be a single circuit board, but rather may be a plurality of circuit boards, or a set of a plurality of devices, such as a virtual device.

Each of the hosts 30 (1), 30 (2) comprises a microprocessor 31, a memory 32, and communication interfaces 33, 34. The memory 32, for example, stores an operating system and an application program 310. The microprocessor 31 reads and executes the application program 310 stored in the memory 35.

The one communication interface 33 is a circuit for communicating with the respective storage systems 20 (1), 20 (2). The other communication interface 34 is a circuit for communicating with the management server 10.

The client terminal 40 comprises a microprocessor 41, a memory 42, a communication interface 43, and a user interface 44. The memory 42, for example, stores a program, such as a web browser, for providing an instruction to the management server 10. The communication interface 43 is a circuit for communicating with the management server 10. The user interface 44 comprises a device for outputting information from the management server 10, and a device for inputting information to the management server 10. Either a display device or a voice output device can be cited as an example of the information output device. A keyboard, pointing device, microphone or the like can be cited as an example of the information input device.

Examples of the configurations of the information used in this embodiment will be explained based on FIGS. 3 through 6. In this embodiment, for example, the various information is explained using expressions such as "XX table", "XX database", "XX list", and "XX queue". However, the various information used in this embodiment does not always have to be data structures like a table, database, list or queue, and structures other than these may be used. That is, the various information used in this embodiment is not dependent on a specific data structure. Furthermore, various expressions, such as "identification information", "identifier", "ID" and "name", for example, may be utilized when explaining the various information used in this embodiment, but these various expressions are interchangeable.

FIG. 3 shows a user management table 120. The user management table 120 is for managing a plurality of users. The respective users manage the copy pair, which is the operation-targeted resource inside the computer system, in accordance with respective roles.

The user management table 120, for example, manages a user ID 121, a password 122 (PW in the drawing), an administrator authority 123, and a role 124.

The user ID 121 is identification information for identifying the plurality of users who manage the computer system. The password 122 is information for authentication use that the user utilizes to log in to the management screen of the management server 10. The administrator authority 123 shows the authority that makes it possible to set a role for another user. A user for whom "1" is set in the administrator authority 123 is provided administrator authority, and is able to set the role of another user. A user for whom "0" is set in the administrator authority 123 is not provided administrator authority, and is not able to set the role of another user.

In this embodiment, only the user who is set as the storage administrator, which is the highest level role, is able to set the role of another user. A log of the roles set for other users by the user who is the storage administrator is recorded in a log management table 150.

The configuration may also be such that it is possible to change the role of a user who has a role that is lower than one's own role. For example, the configuration may be such that the storage administrator is able to set the roles of the copy pair administrator, the application administrator, and the application operator, the copy pair administrator is able to set the roles of the application administrator and the application operator, the application administrator is only able to set the role of the application operator, and the application operator is not able to set a role.

The role 124 denotes the range of management responsibility related to an operation-targeted copy pair (or a consistency group). The respective roles will be explained. The authority possessed by each role will be explained in detail below using FIG. 4.

(1) Storage Administrator

As a "first role", the storage administrator is the highest level administrator, having authority for the management of the entire storage system 20. For example, the storage administrator has authority related to volume resource management, the management of various types of configurations, and various operations. More specifically, the storage administrator is able to create a plurality of logical volumes in the storage system 20, and is able to decide how many logical volumes, from among the plurality of logical volumes, can be used for copy pairs. The storage administrator is able to transfer a portion of his authority to a lower-level administrator (user) than himself. The storage administrator is also able to concurrently serve as the below-described lower-level administrators.

(2) Copy Pair Administrator

As a "second role", the copy pair administrator has authority related to the management and operation of the replication configuration of the storage system 20. The authority designated as copy pair administrator is transferred from the storage administrator. The copy pair administrator is able to create a copy pair by selecting a primary volume and a secondary volume from among volumes prepared beforehand for copy pair creation.

(3) Application Administrator

As a "third role", the application administrator has responsibility for the service level and data preservation of the application program 310. The application administrator has authority for carrying out a backup and a restore with respect to a volume that is used by the management-targeted application program 310. The application administrator is able to carry out operations for a backup and a restore within the range of the application configuration (the copy pair configuration) defined by the copy pair administrator.

(4) Application Operator

As a "fourth role", the application operator has authority for carrying out the maintenance (for example, version upgrades, batch processing, and so forth) that repeatedly occurs in relation to the management-targeted application program 310. The authority of the application operator is transferred from the application administrator. The application operator is able to acquire the backup of a volume being used by the application program 310. However, the application operator is not permitted to perform a restore operation to a volume that is being used by the application program 310.

In this embodiment, the above-mentioned four roles are given as examples of user roles. But the present invention is not limited to these four roles, and the configuration may also be such as to enable the setting of a new role. For example, the configuration may be such that a role of backup administrator, who is charged solely with backup management, may be newly set, and provided with the same authority as the application operator. Also, in the above explanation, it is assumed that, from the viewpoint of the storage administrator, the application operator is a lower-level administrator than the application administrator, the application administrator is a lower-level administrator than the copy pair administrator, and the copy pair administrator is a lower-level administrator than the storage administrator. However, another example of the higher-level/lower-level relationship may be used. For example, in a case where the management server 10 also manages the application program 310, the application administrator may be able to execute a management operation the execution of which would otherwise be prohibited by the storage administrator. Further, the copy pair administrator, application administrator and application operator may not be subject to a higher-level/lower-level relationship, and may all be ranked as administrators who are at a lower level than the storage administrator.

FIG. 4 shows an operational authority management table 130. The operational authority management table 130 manages the operational authority of each role with respect to the operation-targeted copy pair. The operational authority management table 130, together with the user management table 120, is an example of "a management table for correspondingly managing a plurality of roles prepared beforehand for an operation-targeted copy pair, either one or a plurality of operation requests executable by each role, and a plurality of users".

The operational authority management table 130, for example, manages a role 131, a storage setting 132, a replication definition 133, and a replication operation 134. The role 131 is the same as the role 124 described using FIG. 3.

The storage setting 132 denotes the authority for enabling the creation of a logical volume 260 for copy pair use inside the storage system 20. A role for which "enabled" is set in the storage setting 132 is able to create a copy pair logical volume 260 inside the storage system 20.

The replication definition 133 denotes the authority that enables a copy pair to be defined. The replication definition 133 comprises create 1331 and delete 1332.

The create 1331 denotes the authority that enables the creation of a copy pair. Using the authority of the storage setting 132, it is possible to create a copy pair by selecting a primary volume and a secondary volume from among the logical volumes 260 prepared beforehand, and, in addition, carrying out an initial copy from the primary volume to the secondary volume. The delete 1332 denotes the authority that enables a copy pair to be deleted. When deleting a copy pair, the respective volumes that formed this copy pair return to normal volumes and are held inside a volume pool for replication use.

The replication operation 134 denotes the authority that enables a copy pair to be operated. The replication operation 134 comprises a split 1341, a resync 1342, and a restore 1343.

The split 1341 is an operation for suspending a data copy from the primary volume to the secondary volume, or a data copy from the secondary volume to the primary volume. When the host 30 updates the data of the copy-source volume (either the primary volume or the secondary volume) subsequent to a split, difference data is generated between the copy-destination volume (either the secondary volume or the primary volume) and the copy-source volume. Furthermore, in a case where the format for implementing a replication is one that provides a virtual secondary volume in accordance with the Copy-On-Write method, a data copy is not carried out prior to a split. However, the fact that the split operation is one that denotes the creation of data at a certain point in time of the primary volume in the secondary volume is shared in common.

The resync 1342 is an operation for making the data stored in the secondary volume match the data stored in the primary volume by copying the difference data from the primary volume to the secondary volume. Furthermore, the resync operation need not exist in a case where the format for implementing the replication is Copy-On-Write.

The restore 1343 is an operation for making the data stored in the primary volume match the data stored in the secondary volume by copying the difference data from the secondary volume to the primary volume. Taking into account the fact that there may also be cases in which the format for implementing the replication is Copy-On-Write, the restore operation may also return the primary volume data to the data of the primary volume at the certain point in time at which the secondary volume either virtually or actually stored this data.

In a case where data is backed up, a split 1341 is carried out after performing a resync 1342. In a case where a volume is to be restored using backup data, a split 1341 is executed after carrying out the restore 1343. Furthermore, the split may be omitted in the restoration of a volume.

The operation request permitted for each role 131 will be explained. The storage administrator, which is the highest level role, is permitted to execute all operation requests. The copy pair administrator, which is the second role, is permitted to execute the respective operation requests 133, 134 other than the storage setting 132. The application administrator, which is the third role, is permitted to execute only the replication operation 134, and is not permitted to execute the storage setting 132 and the replication definition 133. The application operator, which is the lowest level role, is only permitted to execute the replication operations 134 split 1341 and resync 1342, and is not permitted to execute restore 1343.

The application operator is able to arbitrarily acquire a backup of a primary volume that is associated with the application program 310. However, the application operator is not permitted to use the backup data to restore the storage contents of the primary volume to the storage contents of a prescribed point in time, that is, the application operator is not permitted to execute a restore 1343.

In the case of a resync (backup), it is possible to carry out a resynch independently of the execution status of the application program 310, and, in addition, even when the resync operation generates an error, the affects of this operation on the application program 310 are minimal. This is because the storage contents of the primary volume are accurately maintained.

By contrast, in the case of a restore, the execution status of the application program 310 must be taken into account during execution. Because the application program 310 uses the primary volume to carry out prescribed information processing, a case in which the storage contents of the primary volume are suddenly changed to backup data will have a big impact on the application program 310. In addition, in a case where the storage contents of the primary volume are destroyed as the result of an operational error, it is highly likely that the application program 310 will become unable to execute the prescribed information processing correctly. Accordingly, in this embodiment, the application operator is only permitted the authority to execute a resync operation and a split operation, and is not granted authority for a restore operation.

FIG. 5 shows a copy group management table 140. The copy group management table 140 manages a copy pair as an operation-targeted resource. As will be explained below, it is also possible to create a single group from a plurality of copy pairs that are associated with one another. This is called a consistency group.

Specifically, the copy group is a grouping of a plurality of copy pairs, and is used for efficiently carrying out a batch operation. Various types of operations are carried out in copy pair units. By contrast, the consistency group is an attribute given to a copy group, and the consistency group is able to apply an operation with respect to a specific copy pair to the entire group.

That is, the consistency group is also a copy group, and guarantees that each of a plurality of copy pairs inside the group is able to be split so as to satisfy the consistency, which will be explained below, for the secondary volumes of the plurality copy pairs inside the group.

(1) In a case where the host writes the first data A and then the next data B to the primary volume in order, the host writes the data B to the primary volume after waiting until a data A write-complete has arrived from the storage system.

(2) For a write that satisfies the conditions of (1), subsequent to a split, either all or a part of the data of data B is stored in the secondary volume only in a case where all of data A is stored in the secondary volume.

Furthermore, an item explained with respect to the "copy group" in the following explanation will also be applicable to the consistency group.

The copy group management table 140, for example, manages a group ID 141, primary volume information 142, secondary volume information 143, and a status 144. Furthermore, although not disclosed in FIG. 4, the copy group management table 140 also manages the identifier of a copy pair identified by the primary volume information 142 and the secondary volume information 143. The group ID 141 is information for identifying the copy group to which respective copy pairs belong.

The primary volume information 142 is for identifying a primary volume that configures a copy pair. The primary volume information 142, for example, comprises information 1421 for identifying a logical volume 260, and information 1422 for identifying a storage system 20. Similarly, the secondary volume information 143 is for identifying a secondary volume that configures a copy pair. The secondary volume information 143, for example, comprises information 1431 for identifying a logical volume 260, and information 1432 for identifying a storage system 20.

The status 144 denotes the status of a copy pair. The copy pair status may include "pair", "suspend", "copying (PVOL→SVOL)" and "copying (SVOL→PVOL)". "Pair" denotes the status in which primary volume storage contents and the secondary volume storage contents are synchronized. "Suspend" denotes either a status in which the synchronization of the primary volume and the secondary volume has been canceled, or a status in which the primary volume data of a prescribed point in time has been stored in the secondary volume. "Copying (PVOL→SVOL)" denotes the state in which data is being copied from the primary volume to the secondary volume. "Copying (SVOL→PVOL)" denotes the state in which data is being copied from the secondary volume to the primary volume.

FIG. 6 shows a log management table 150. The log management table 150 manages a log of the role changes of the respective users. The log management table 150, for example, manages a date/time 151, an execution user 152, a target user 153, and an operational content 154.

The date/time 151 denotes the date and time at which a role was set (or changed. The same holds true below). The execution user 152 is information for identifying the user who set the role for the target user 153. In this embodiment, only the storage administrator is able to set the role for another user. The target user 153 is information for identifying the user for which a role has been set. The operational content 154 denotes information such as the role that has been set for the target user. The operational content 154, for example, may include information that identifies the name of the role that has been set and the operation-targeted resource (copy pair).

The role setting process will be explained by referring to FIG. 7. The various processes described hereinbelow are realized in accordance with the microprocessor 11 of the management server 10 reading and executing the storage management program 110. For convenience sake, the management server 10 will be used as the subject of the action in the following explanation. Furthermore, the same holds true for items other than those in FIG. 7 explained using the management server 10 in that the processing is realized by the microprocessor 11 reading and executing the storage management program 110.

As described using FIG. 3, the specific user who has administrator authority 123 is able to set the role for another user. The user for which the role of storage administrator has been set (simply called the storage administrator) accesses the management server 10 via the client terminal 40 and inputs a password and a user ID into the management server 10.

The management server 10 performs user authentication by determining whether or not the user ID and password are registered in the user management table 120 (S10). The management server 10 determines whether or not the user desiring to log in has administrator authority.

When user authentication is successful, the management server 10 sends a user management screen 500 to the client terminal 40, and displays this screen on the client terminal 40 (S11). The user having administrator authority uses the user management screen 500 to set the roles for the other users. The management server 10 receives the operational input from the user (S12), and determines the propriety thereof (S13).

That is, the management server 10 determines whether or not the role settings for the other users being inputted by the user having administrator authority are permissible (S13). For example, as in another example that will be explained hereinbelow, in a case where it is possible to set a role for each copy pair, the management server 10 is able to determine whether or not it is possible to set a specified role for a specified user with respect to a specified copy pair.

Or, in the case of a configuration in which the changing of a role set for a user is prohibited beforehand, it is possible to make a determination in S13 with respect to setting this prohibited role for a user.

Or, the configuration may be such that S13 is discarded. For example, in a case where it is possible to confirm in S10 that the user wishing to log in has administrator authority related to the identified copy pair (or consistency group), it is possible to discard the error processing of S13 and S15.

A case in which the management server 10 determines the propriety of the user management table 120 prior to updating the user management table 120 will be explained (S13). In a case where updating of the user management table 120 is permitted (S13: YES), the management server 10 updates the user management table 120 (S14). In a case where updating of the user management table 120 is not permitted (S13: NO), the management server 10 performs error processing (S15). In the error processing, for example, an error message, such as "This role setting is prohibited. Please make sure you set the correct role." is displayed on the client terminal 40.

Furthermore, it is also possible to configure the user management screen 500 such that a user who has logged in to the user management screen 500 is only able to perform an operation for which he has permission. The configuration is such that items that the user is not able to operate are either not displayed on the user management screen 500, or are displayed dimly but are not able to be operated. The above-mentioned screen configuration method may also be carried out the same way for another management screen that will be explained below.

Figure 8:
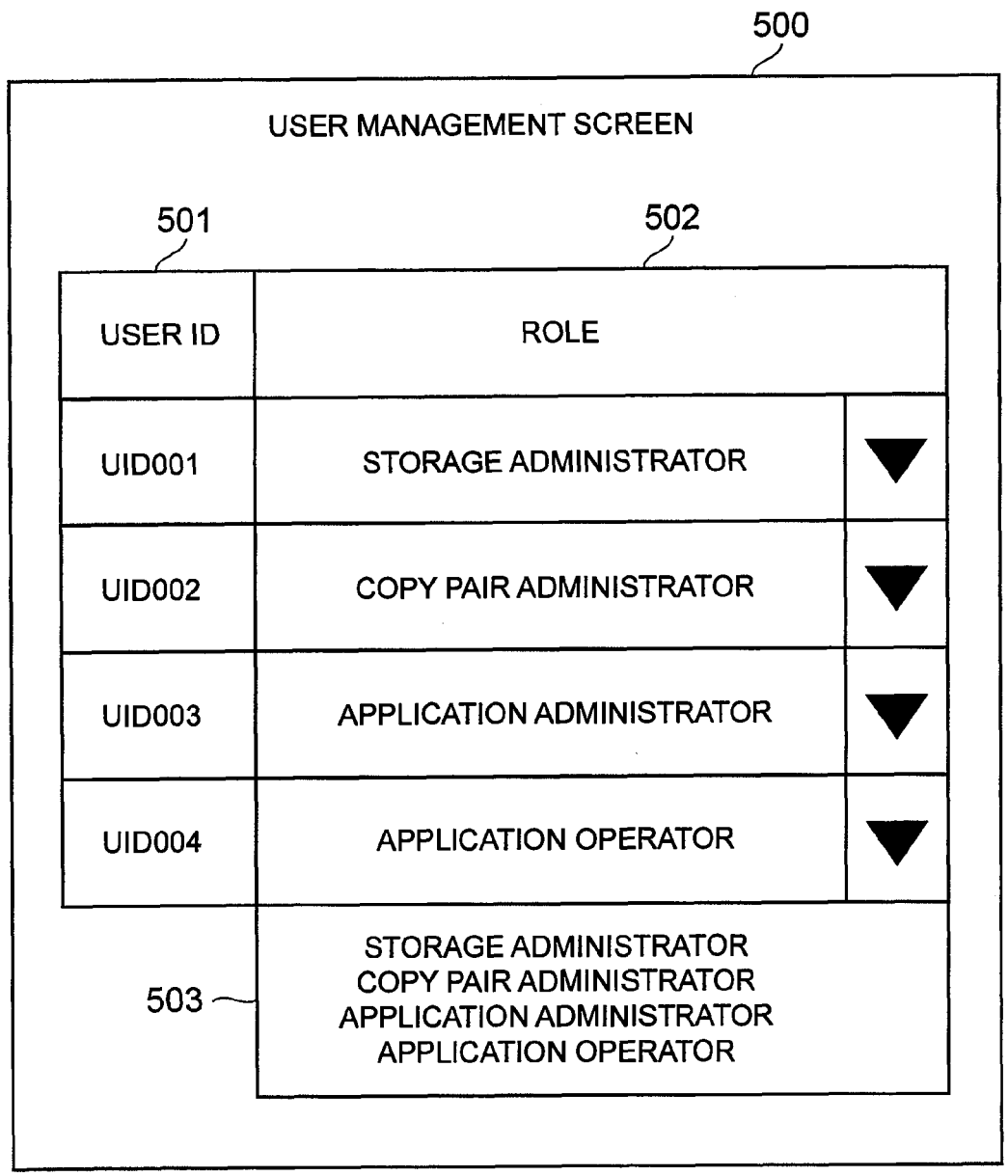
FIG. 8 is a management screen for setting a role for a user.

FIG. 8 shows the user management screen 500. The user management screen 500, for example, comprises a user ID display part 501 and a role setting part 502. The user ID display part 501 is an area for displaying the IDs of the respective users who manage the computer system.

The role setting part 502 is an area for displaying the names of the roles that have been set for the respective users. The role setting part 502, for example, may comprise a so-called pull-down menu 503. The user having administrator authority selects one desired role from the pull-down menu 503.

An operational authority setting process will be explained by referring to FIG. 9. In the operational authority setting process, it is possible to set operations that are able to be executed by the respective roles as described below.

The management server 10 performs authentication for a user desiring to log in to the operational authority management screen 510 (S20). Furthermore, user authentication is the same as all or part of the processing/screen explained using FIG. 7 and FIG. 8. When user authentication is successful, the management server 10 sends and displays the operational authority management screen 510 shown in FIG. 10 on the client terminal 40 (S21). The configuration of the operational authority management screen 510 will be explained below.

The management server 10 receives operational input from the user (S22), and determines whether or not to permit this operation (to change the operational authority) (S23). In a case where the change of operational authority is permitted (S23: YES), the management server 10 updates the operational authority management table 130 (S24). In a case where the change of operational authority is not permitted (S23: NO), the management server 10 performs error processing (S25). In the error processing, for example, an error message, such as "This change is prohibited." is sent on the client terminal 40 and displayed. Furthermore, as described hereinabove, the configuration can be such that an item that the user is not able to change will either not be displayed on the screen 510, or will be displayed but will be not operable.

FIG. 10 shows the operational authority management screen 510. The operational authority management screen 510, for example, comprises a role display part 511, storage setting display part 512, a replication definition display part 513, and a replication operation display part 514.

The role display part 511 is an area for displaying the names of the respective roles. The storage setting display part 512 is an area for displaying the presence or absence of authority for enabling a storage setting to be carried out. The replication definition display part 513 is an area for displaying a request related to a replication definition. The replication operation display part 514 is an area for displaying a request related to a replication operation.

The replication definition display part 513 comprises a create request display part 5131 and a delete request display part 5132. The replication operation display part 514 comprises a split request display part 5141, a resync request display part 5142, and a restore request display part 5143.

The user who wants to change the operational authority selects the desired request of the desired role (512, 5131, 5132, 5141 through 5143), and sets either "enabled" or "disabled".

In this embodiment, the operation request that is possible for each role is set beforehand, and a case where these roles are fixed such that the user is not able to change them will be explained. However, as described using FIGS. 9 and 10, for example, the configuration may be such that the user having administrator authority is able to change the operation requests permitted for each role. In accordance with this, the user having administrator authority is also able to add a new operation request.

A sequence of processes related to a copy pair will be explained by referring to FIGS. 11 through 14. FIG. 11 is a flowchart showing the definition of a copy pair and the creation of a pair. The storage administrator logs in to the management server 10 and performs a storage setting (S30). That is, the storage administrator creates a plurality of primary volumes and a plurality of secondary volumes, and registers these volumes in the volume pool.

The management server 10 uses the operational authority management table 130 to determine whether or not the storage administrator has the authority to carry out a storage setting (S31). The processing for determining the presence or absence of this authority will be explained in detail using FIG. 14. When the operational authority of the storage administrator is confirmed, the management server 10 implements the storage setting based on an instruction from the storage administrator (S32).

Next, the copy pair administrator logs in to the management server 10, and instructs the management server 10 to form a pair (S40). The management server 10 carries out user authentication for the copy pair administrator and determines whether or not the copy pair administrator has the authority to issue a pair creation request (S41).

When the management server 10 confirms the operational authority of the copy pair administrator, the management server 10 instructs the storage system 20 to form a pair (S42). The storage system 20 updates a copy pair table that is stored in either the storage system memory or the cache memory in accordance with the pair creation request from the management server 10 (S43).

Furthermore, the copy pair table is information in which is registered a pair of identifiers of the primary volume and the secondary volume for which copying is to be performed via either a local copy or a remote copy.

In accordance with this, a copy pair is formed using a specified primary volume and a specified secondary volume. Next, the storage system 20 carries out an initial copy from the primary volume to the secondary volume in accordance with the copy pair table. The initial copy is processing for copying the data of the primary volume to the secondary volume to make the data stored in both volumes match.

The process for acquiring a backup will be explained by referring to the flowchart of FIG. 12. The application operator logs in to the management server 10, and instructs the management server 10 to acquire a backup (issues a resync request) (S50).

The management server 10 performs user authentication for the application operator and determines whether or not the application operator has backup acquisition authority (S51). The management server 10, upon confirming the authority of the application operator, issues a resync request to the storage system 20, and instructs the creation of a backup (S52).

The storage system 20 copies the data of the primary volume to the secondary volume in accordance with the resync request from the management server 10 (S53). Subsequent to completion of the above-described initial copy, the data stored in the primary volume and the data stored in the secondary volume match. Thereafter, when the copy pair is split and the host 30 updates the primary volume data, difference data is generated between the primary volume and the secondary volume. This difference data is managed inside the storage system 20. Therefore, the storage system 20 copies the difference data from the primary volume to the secondary volume to make the data of the primary volume and the data of the secondary volume match. In accordance with this, a backup of a prescribed point in time of the primary volume is created. Thereafter, the storage system 20 splits the primary volume and the secondary volume, and resumes difference data management (S54). Furthermore, the authority determination of S51 may be determined at a minimum for the split operation. This is an example of a case in which copy pair that has already undergone a resync is to be operated, or a case that is targeted at a Copy-On-Write copy, which does not require a resync. However, the authority determination of S51 may be determined for the resync operation as well.

A restore process will be explained by referring to the flowchart of FIG. 13. The application administrator logs in to the management server 10 and requests that the management server 10 execute a restore (S60). The management server 10 performs user authentication for the application administrator, and also determines whether or not the application administrator has restore execution authority (S61).

The management server 10, upon confirming the authority of the application administrator, sends a restore request to the storage system 20 (S62). The storage system 20 copies the difference data generated between the secondary volume and the primary volume from the secondary volume to the primary volume in accordance with the restore request from the management server 10 (S63). More abstractly stated, S63 is a step for changing the data stored in the primary volume to the data stored in the secondary volume.

In accordance with this, the storage contents of the primary volume match the storage contents of the secondary volume. Subsequent to completion of the difference data copy, the storage system 20 splits the primary volume and the secondary volume and moves these volumes to the suspend state. Furthermore, the authority determination of S61 may be determined at the least for the restore operation, and the authority determination may also be determined for a resync operation.

Figure 13:
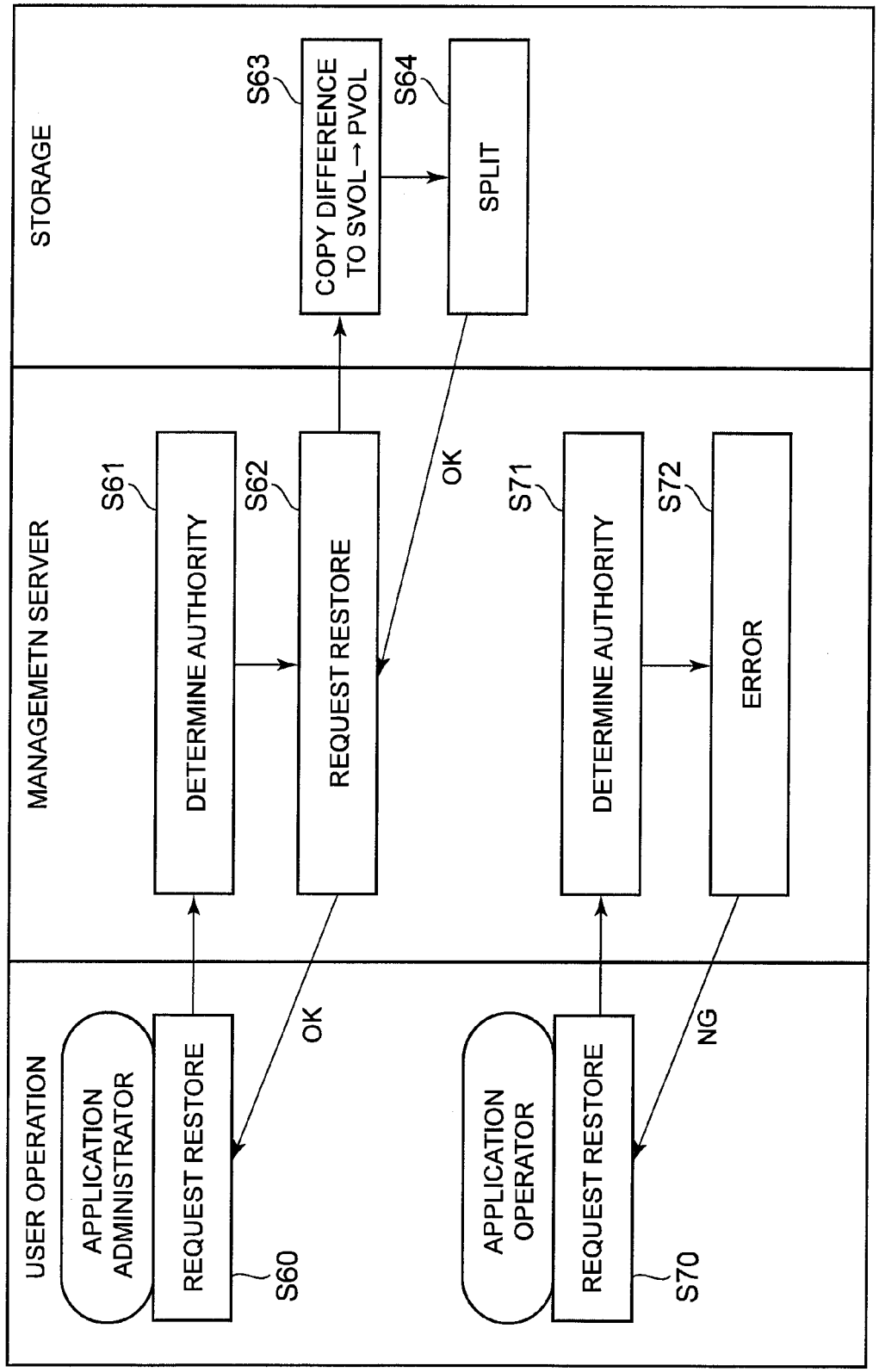
FIG. 13 is a diagram showing how to perform a restore.

The bottom part of FIG. 13 shows what happens in a case where the application operator attempts to carry out a restore operation. The application operator logs in to the management server 10 and requests that the management server 10 execute a restore (S70).

The management server 10 confirms the authority of the application operator (S71). As described above, in this embodiment, the authority to execute a restore is not given to the application operator.

Therefore, the management server 10 executes error processing without issuing a restore request (S72). In the error processing, for example, an error message, such as "You do not have restore authority", is sent to and displayed on the client terminal 40.

Figure 7:
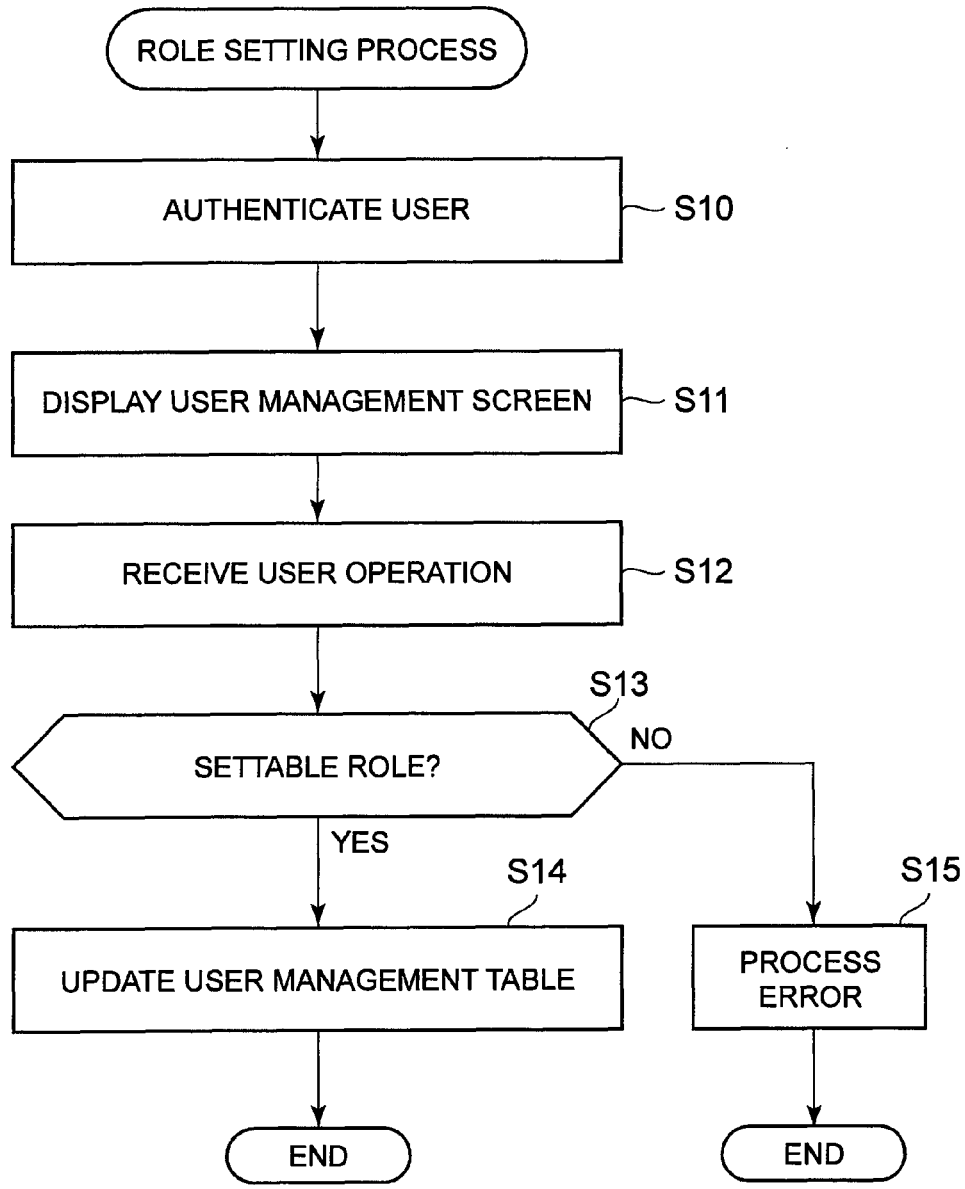
FIG. 7 is a flowchart showing the process for setting a role for a user.
Figure 12:
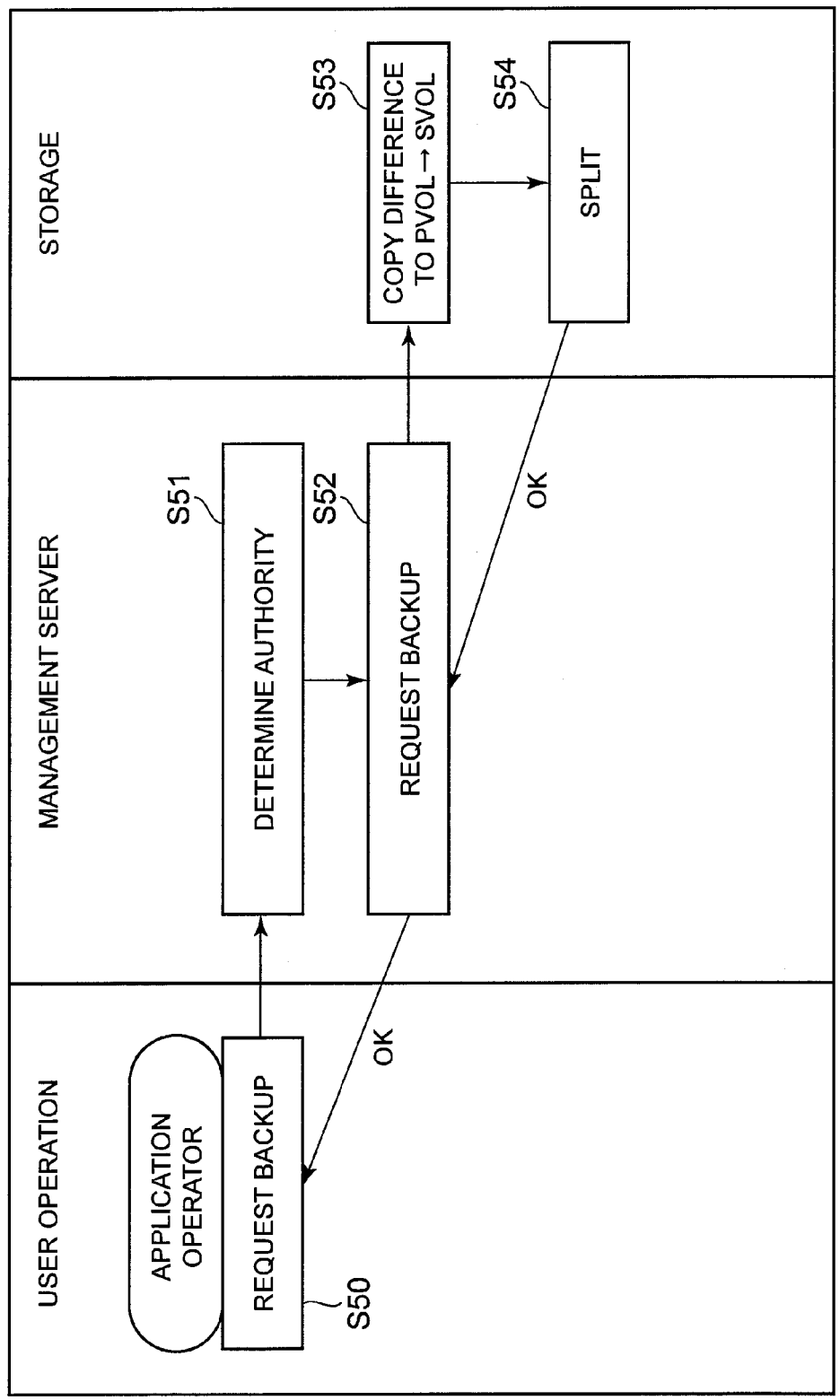
FIG. 12 is a diagram showing how to perform a backup.

Furthermore, the user authentications of FIGS. 11 through 13 are either all or partially the same as the user authentications explained using FIG. 7 and FIG. 9.

Figure 14:
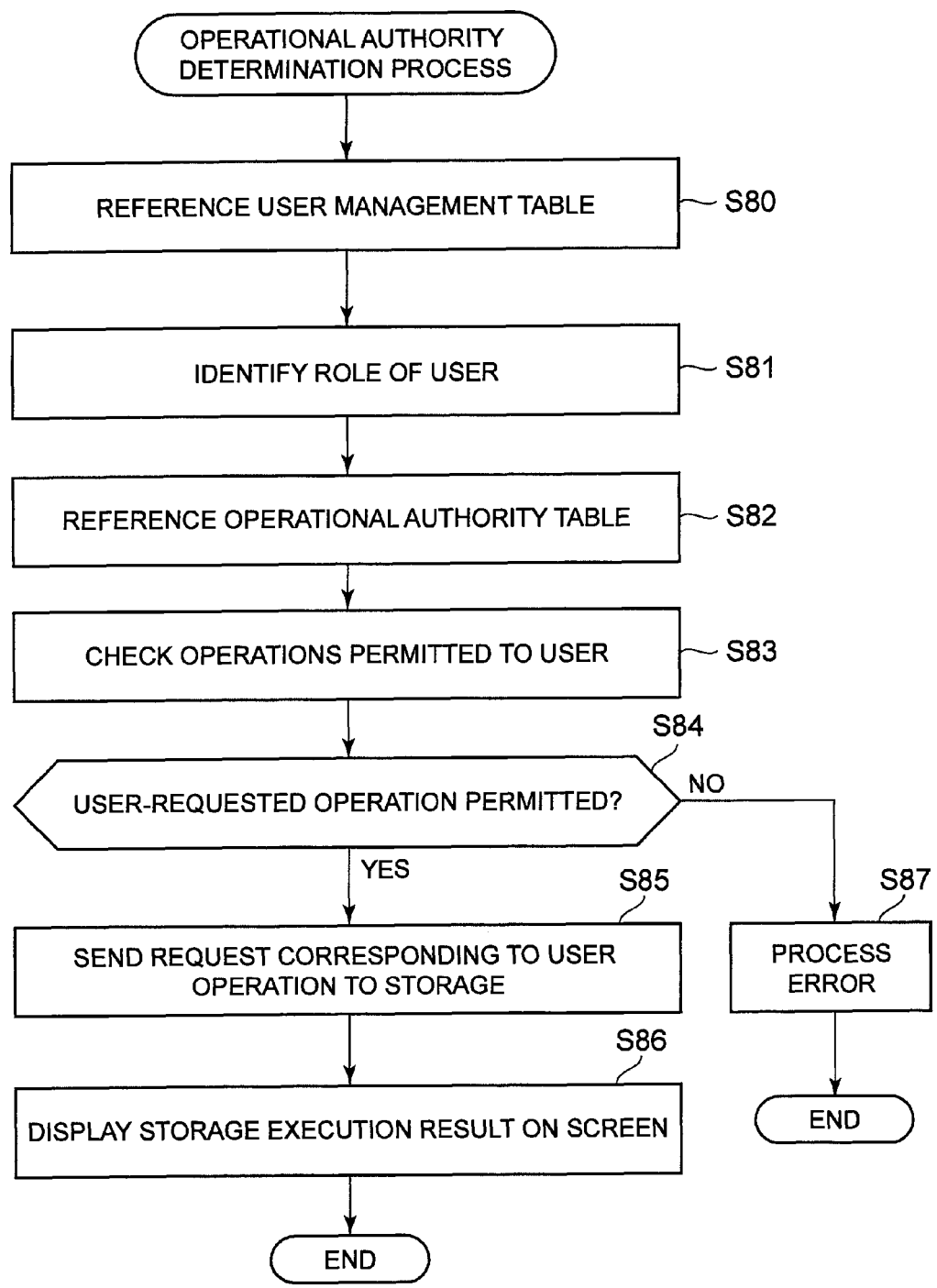
FIG. 14 is a flowchart showing the process for determining the propriety of a user operation.

FIG. 14 shows the process for determining a user's operational authority. This process corresponds to S31, S41, S51, S61 and S71 explained hereinabove.

In this process, a description of user authentication based on the user ID and password has been omitted. In addition, for the sake of explanation, the flowchart of FIG. 14 also comprises the step (S86) that is executed after determining the operational authority.

The management server 10 references the user management table 120 based on the user ID of the user who has logged in (S80), and identifies the role that has been set for the user (S81). The management server 10 references the operational authority management table 130 based on the role identified in S81 (S82), and confirms the operation (operation request) permitted for the user (S83).

The management server 10 determines whether or not the user-requested operation is permitted for this user (S84). In a case where the user-requested operation is permitted (S84: YES), the management server 10 sends a request corresponding to the user-requested operation to the storage system 20 (S85).

The storage system 20 executes the processing related to the copy pair in accordance with the request received from the management server 10, and replies to the management server 10 with this execution result. The management server 10, upon receiving the execution result from the storage system 20, sends this execution result to the client terminal 40 and displays same thereon (S86). Furthermore, as described hereinabove, because S86 is executed subsequent to a determination as to the propriety of the operation having been made, this step may also be omitted from this process.

In a case where the user-requested operation is not permitted (S84: NO), the management server 10 executes error processing (S87). The management server 10, for example, sends an error message to the client terminal 40 and displays this message thereon.

Configuring this example like this makes it possible to set and manage an executable operation for each user with respect to a single copy pair. Therefore, it is possible to enhance user usability, and to prevent in advance the occurrence of a failure due to a copy pair operational error, enabling system reliability to be improved.

In addition, in this embodiment, because the user management table 120 is stored in the management server 10, the management server 10 is able to integratively manage the operational authority related to a copy pair even in a case where this copy pair is configured spanning a plurality of storage systems 20.

For example, as shown in FIG. 1, even in a case where a remote copy is carried out between a logical volume 260 (PVOL) of the first storage system 20 (1) and a logical volume 260 (S/PVOL) of the second storage system 20 (2), the management server 10 is able to control the execution restrictions related to this remote copy pair.

In addition, in this embodiment, because the concept of a role is used for managing the operation requests permitted for each user, there is no need to individually set a propriety of execution for each operation request from each user. In this embodiment, the propriety of execution of an operation request is defined beforehand for each user (FIG. 4), and corresponds to the role of each user (FIG. 3). Therefore, the execution authority to be permitted for each user related to the operation of a copy pair is able to be set relatively easily.

[Embodiment 2]

A second embodiment will be explained by referring to FIGS. 15 through 17. Because this embodiment corresponds to a variation of the first embodiment, the explanation will focus on the points of difference with the first embodiment. In this embodiment, the copy pairs, which are the operation-targeted resources, are grouped together and associated with the respective users. That is, in this embodiment, it is possible to set the roles of the respective users for each of a plurality of copy groups.

FIG. 15 shows the user management table 120A. The user management table 120A of this embodiment is the same as the user management table 120 shown in FIG. 3, and comprises a user ID 121, a password 122, an administrator authority 123A, and a role 124A. In addition, the user management table 120A of this embodiment also comprises a group ID 125A.

The group ID 125A is information for identifying a copy group that comprises a plurality of copy pairs.

In this embodiment, it is possible to provide a plurality of copy groups, and it is also possible to associate each user with a plurality of copy groups. Accordingly, a plurality of groups IDs 125A are associated with a single user ID 121 in the user management table 120A.

In addition, in this embodiment, it is possible to set the respective roles of the users for each copy group. Accordingly, a plurality of roles 124A and a plurality of administrator authorities 123A are associated with a single user ID 121 in the user management table 120A.

In the example shown in FIG. 15, a user (UID001) has storage administrator, which is a higher-level role, set for the one copy group (GID010), and has application operator, which is a lower-level role, set for the other copy group (GID020). As a further example, another user (UID004) has application operator set for the one copy group (GID010), and has storage administrator set for the other copy group (GID020).

Figure 16:
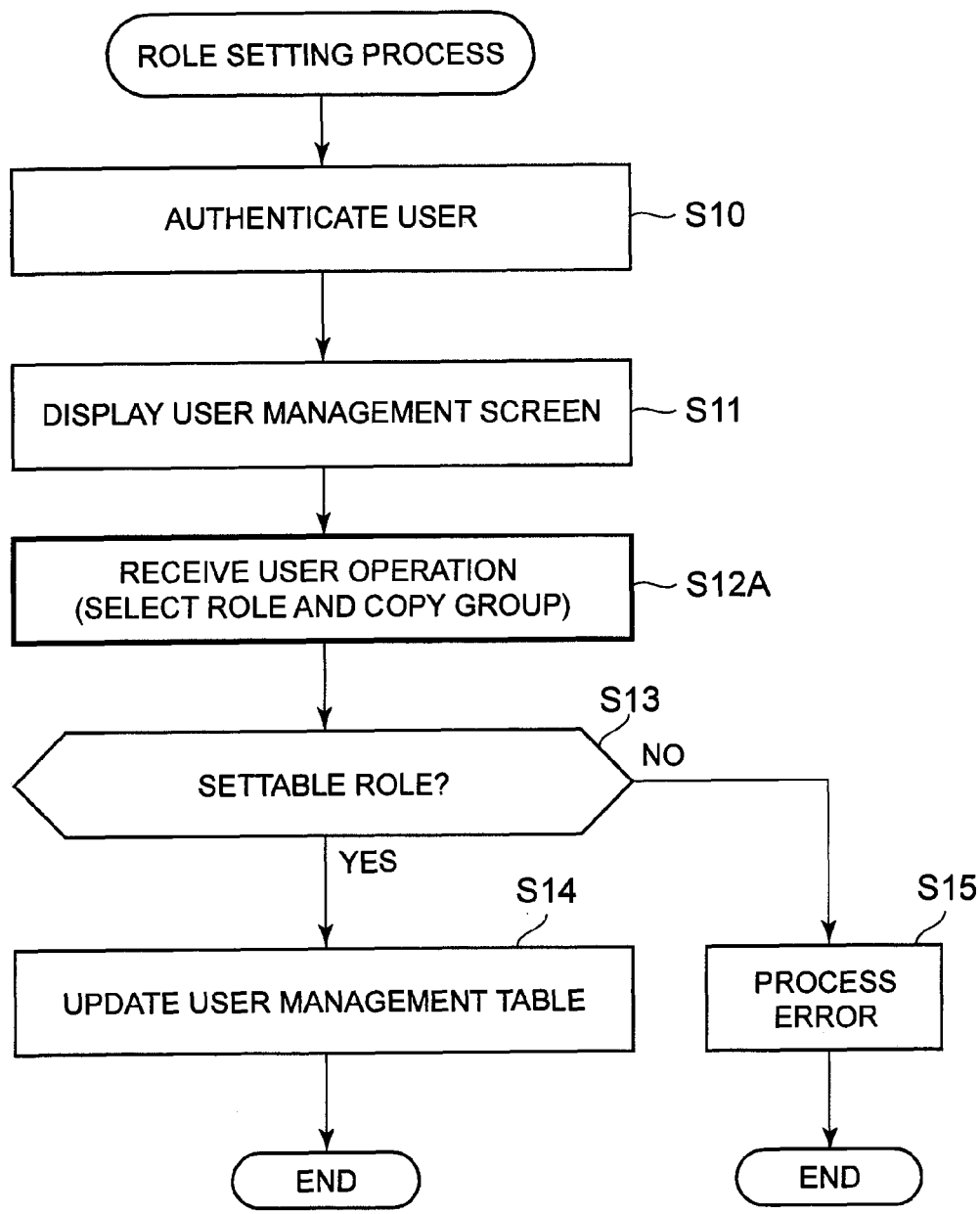
FIG. 16 is a flowchart of a role setting process.

FIG. 16 is a flowchart of the role setting process. This process comprises the respective steps of S10 through S15 the same as the flowchart of FIG. 7. However, in this process, it is possible to respectively set the role of each user for each copy group (S12A).

FIG. 17 schematically shows the relationships of the respective users, the respective copy groups and the respective roles. A plurality of users UA through UD are displayed in the center of FIG. 17. Each user is associated with a plurality of copy groups CGA, CGB.

The one copy group CGA is configured from one copy pair. By contrast, the other copy group CGB is configured from a plurality of copy pairs that are related to one another.

The respective users UA through UD have different roles for each copy group CGA, CGB. For example, the user UA has storage administrator set for the one copy group CGA, but has application operator set for the other copy group CGB.

Similarly, the user UB has copy pair administrator set for the one copy group CGA, but has application administrator set for the other copy group CGB. The user UC has application administrator set for the one copy group CGA, but has copy pair administrator set for the other copy group CGB. The user UD has application operator set for the one copy group CGA, but has storage administrator set for the other copy group CGB. Furthermore, in FIG. 17, the relationships between the copy group CGA, the users and the roles are represented using solid lines, and the relationships between the copy group CGB, the users and the roles are represented using dotted lines.

Configuring this example like this exhibits the same effects as the first example. In addition, in this embodiment, it is possible to set a user role for each of a plurality of copy groups. For this reason, in this embodiment, it is also possible to set a different role for each copy group for the same user, and it is also possible to set roles that are shared in common for the respective copy groups. For example, it is possible to make settings for the same user such that a restore of a local copy pair is permitted, but a restore of a remote copy pair is not permitted. Therefore, usability is enhanced even more than in the first example.

In a case where there is a large number of copy pairs, it is even easier to make a setting that targets a copy group. This is because the copy group is a single operation unit, thereby making it possible to change the roles allocated to a certain user for each copy group using fewer setting items. However, in the second example, a copy pair may be targeted instead of a copy group, and may be used concurrently in the case of a copy group.

Furthermore, in a case where the operable copy pair operation is fixed for each role, the present invention may be realized without using the operational authority management table 130 by embedding a determination in the storage management program 110 with an operable copy pair as a conditional branch.

Furthermore, the present invention is not limited to the above-described embodiment. A person with ordinary skill in the art, for example, will be able to make various additions and changes within the scope of the present invention so as to combine the above-mentioned examples as the occasion may demand.

What is claimed is:

1. A computer system, comprising:
a storage system including a copy-source volume which is a logical volume of copy source, and a copy-destination volume which is a logical volume of copy destination; and
a management system including a communication interface circuit which communicates with the storage system via a communication line, a memory which stores a prescribed program for managing the storage system, and a microprocessor which reads the prescribed program from the memory and executes the prescribed program,
wherein the microprocessor receives an operation request, inputted from a user, and designating to a copy pair configured from the copy-source volume and the copy-destination volume,
wherein the microprocessor determines whether or not to permit the execution of the operation request for the user who has inputted the operation request,
wherein, in a case where the execution of the operation request is permitted, the microprocessor sends a request corresponding to the operation request to the storage system,
wherein a role related to the copy pair operation is set beforehand for the user,
wherein the microprocessor determines whether or not to permit the execution of the operation request based on roles of the user,
wherein the operation request includes a prescribed operation request for changing the storage content of the copy-source volume,
wherein, in one of the roles the user is permitted to execute the prescribed operation request, and in another of the roles the user is prohibited from executing the prescribed operation request,
wherein the roles comprise:
a first role that is able to execute all operation requests related to the operation-targeted copy pair;
a second role that is able to execute, from among the all of operation requests, a request that creates the copy pair, a request that deletes the copy pair, a split request, a resync request, and a restore request;
a third role that is able to execute, from among the all of operation requests, the split request, the resync request, and the restore request; and
a fourth role that is able to execute, from among the all of operation requests, the split request and the resync request.

2. A computer system according to claim 1, wherein the memory stores a management table for managing, in association with each other, the roles, wherein the roles are prepared beforehand in relation to the operation-targeted copy pair, one or a plurality of operation requests that are able to be executed for each of the roles, and a plurality of users, and
wherein the microprocessor uses the management table to determine whether or not to permit the execution of the operation request based on the roles of the users. request, 3. A computer system according to claim 1,
wherein a plurality of operation-targeted copy pairs are provided, and
wherein a role for a first copy pair of the plurality of copy pairs and a role for a second copy pair of the plurality of copy pairs can be set such that these roles differ for the user.

4. A computer system according to claim 3,
wherein the operation-targeted copy pairs comprise a third copy pair,
wherein the third copy pair is associated with one of the first copy pair and the second copy pair, and
wherein an operation request executed for the one of the first copy pair and the second copy pair that is associated with the third copy pair, is also executed for the third copy pair.

5. A computer system according to claim 1,
wherein a plurality of storage systems are provided,
wherein the copy-source volume is in one storage system of the plurality of storage systems, and
wherein the copy-destination volume is in another storage system of the plurality of storage systems.

6. A computer-readable recording medium on which is recorded a program for causing a computer that is coupled via a communication line to a storage system including a copy-source volume and a copy-destination volume to execute:
a request receiving function that receives an operation request, which is inputted by a user, and which has, as an operation target, a copy pair configured from the copy-source volume and the copy-destination volume;
a determination function that determines whether or not to permit the execution of the operation request for the user who has inputted the operation request; and
a request issuing function, which, in a case where execution of the operation request is permitted, issues to the storage system a request corresponding to the operation request,
wherein a plurality of roles related to the operation of the copy pair is set beforehand for the user,
wherein the determination function determines whether or not to permit the execution of the operation request based on the roles of the user,
wherein the operation request comprises a prescribed operation request for changing the storage content of the copy-source volume,
wherein, in one of the roles the user is permitted to execute the prescribed operation request, and in another of the roles the user is prohibited from executing the prescribed operation request,
wherein the roles comprise:
a first role that is able to execute all operation requests related to the operation-targeted copy pair,
a second role that is able to execute, from among all of the operation requests, a request that creates the copy pair, a request that deletes the copy pair, a split request, a resync request, and a restore request,
a third role that is able to execute, from among all of the operation requests, the split request, the resync request, and the restore request, and
a fourth role that is able to execute, from among all of the operation requests, the split request and the resync request.

7. A computer-readable recording medium according to claim 6, wherein the determination function determines whether or not to permit the execution of the operation request based on the roles of the user by using a management table for managing, in association with each other, the roles, wherein the roles are prepared beforehand in relation to the operation-targeted copy pair, and one or a plurality of operation requests that are able to be executed for each of the roles.

8. A computer-readable recording medium according to claim 6, wherein
a plurality of operation-targeted copy pairs are provided, and
a role for a first copy pair of the plurality of copy pairs and a role for a second copy pair of the plurality of copy pairs can be set such that these roles differ for the user.

9. A computer-readable recording medium according to claim 6, wherein
the operation-targeted copy pairs comprise a third copy pair,
the third copy pair is associated with one of the first copy pair and the second copy pair, and
an operation request that is executed for the one of the first copy pair and the second copy pair that is associated with the third copy pair, is also executed for the third copy pair.

* * * * *